(12) United States Patent
Dudar (10) Patent No.: US 12,018,625 B1
(45) Date of Patent: Jun. 25, 2024

(54) METHODS AND SYSTEMS FOR AN EVAPORATIVE EMISSION SYSTEM

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/304,885

(22) Filed: Apr. 21, 2023

(51) Int. Cl.
*F02D 41/00* (2006.01)
*B60W 20/15* (2016.01)
*F02D 41/02* (2006.01)

(52) U.S. Cl.
CPC .......... *F02D 41/003* (2013.01); *B60W 20/15* (2016.01); *F02D 41/021* (2013.01); *F02D 2200/0602* (2013.01)

(58) Field of Classification Search
CPC ................. F02D 41/003; F02D 41/021; F02D 2200/0602; B60W 20/15
See application file for complete search history.

(56) References Cited

U.S. PATENT DOCUMENTS

| | | | |
|---|---|---|---|
| 9,856,830 B2 | 1/2018 | Dudar | |
| 10,550,776 B1 * | 2/2020 | Leone | B60K 15/03519 |
| 10,598,134 B1 * | 3/2020 | Dudar | F02M 26/48 |
| 10,612,479 B1 * | 4/2020 | Dudar | F02D 41/0045 |
| 10,718,282 B2 | 7/2020 | Dudar | |
| 10,961,937 B2 | 3/2021 | Dudar | |
| 11,067,013 B2 | 7/2021 | Dudar et al. | |
| 11,333,095 B1 * | 5/2022 | Dudar | F02M 25/0836 |
| 2013/0220282 A1 | 8/2013 | Hadre et al. | |
| 2015/0090234 A1 | 4/2015 | Dudar et al. | |
| 2016/0341155 A1 * | 11/2016 | Dudar | F02D 41/0007 |
| 2017/0174501 A1 * | 6/2017 | Dudar | B67D 7/0492 |
| 2017/0342931 A1 * | 11/2017 | Dudar | B60K 15/03 |
| 2019/0107081 A1 * | 4/2019 | Dudar | F02D 41/0037 |
| 2020/0079330 A1 * | 3/2020 | Dudar | B60K 6/22 |
| 2020/0149482 A1 * | 5/2020 | Dudar | F02M 25/0836 |
| 2020/0149483 A1 * | 5/2020 | Dudar | F02M 25/0836 |
| 2020/0189385 A1 * | 6/2020 | Dudar | B60K 15/03504 |
| 2020/0386193 A1 * | 12/2020 | Dudar | F02B 37/18 |
| 2021/0071599 A1 * | 3/2021 | Dudar | F02M 25/089 |

FOREIGN PATENT DOCUMENTS

KR 101029143 B1 4/2011

OTHER PUBLICATIONS

Halvorson, B., "California plan: 80% EVs by 2035, 50-mile plug-in hybrids, tighter tailpipe emissions," Green Car Reports Website, Available Online at https://www.greencarreports.com/news/1132190_california-plan-80-fully-electric-by-2035-50-mile-plug-in-hybrids-tighter-tailpipe-emissions, May 7, 2021, 24 pages.

\* cited by examiner

*Primary Examiner* — Joseph J Dallo
(74) *Attorney, Agent, or Firm* — Vincent Mastrogiacomo; McCoy Russell LLP (57) ABSTRACT

Methods and systems are provided for a fuel system. In one example, a method may include monitoring uncontrolled venting events when a controller is off and adjusting a cleaning schedule of a canister based on a venting event count including venting events when the controller is on and off.

20 Claims, 7 Drawing Sheets

METHODS AND SYSTEMS FOR AN EVAPORATIVE EMISSION SYSTEM

FIELD

The present description relates generally to methods and systems for an evaporative emissions control system of a vehicle.

BACKGROUND/SUMMARY

Vehicle fuel systems include evaporative emission control systems (EVAP) designed to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system allows the vapors to be purged into the engine intake manifold for use as fuel. Fuel vapors may be generated as refueling, running loss, hot soak, and diurnal temperature vapors. In a hybrid vehicle, the fuel vapors stored in the canister are primarily refueling vapors.

As regulations continue to require reduced vehicle greenhouse emissions, vehicle manufacturers may increase an electrical capability of one or more vehicles of a vehicle fleet. The expansion of electric vehicle capabilities may result in reduced engine operating times, and therefore reduced opportunities for fuel vapors to be consumed during canister venting. Thus, methods and system that differentiate from those that already exist may be desired to meet the more stringent regulations described above.

In one example, the issues described above may be addressed by a method for a fuel system of a vehicle, the method including monitoring a sensed fuel tank pressure transducer (FTPT) pressure, tracking a number of events comprising where the sensed FTPT pressure changed by a threshold pressure change, and adjusting a canister cleaning schedule based on the number of events. In this way, cleaning events when the controller is off are monitored and tracked.

As one example, an estimated canister load is modified to account for venting events when the controller is off. A wake-up circuit may wake up the controller in response to the sensed pressure change. The controller may increase a venting event count and adjust the cleaning schedule in response to a comparison of the venting event count to a threshold event count. By doing this, the canister may be cleaned more frequently and fewer vapors may be leaked to atmosphere.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
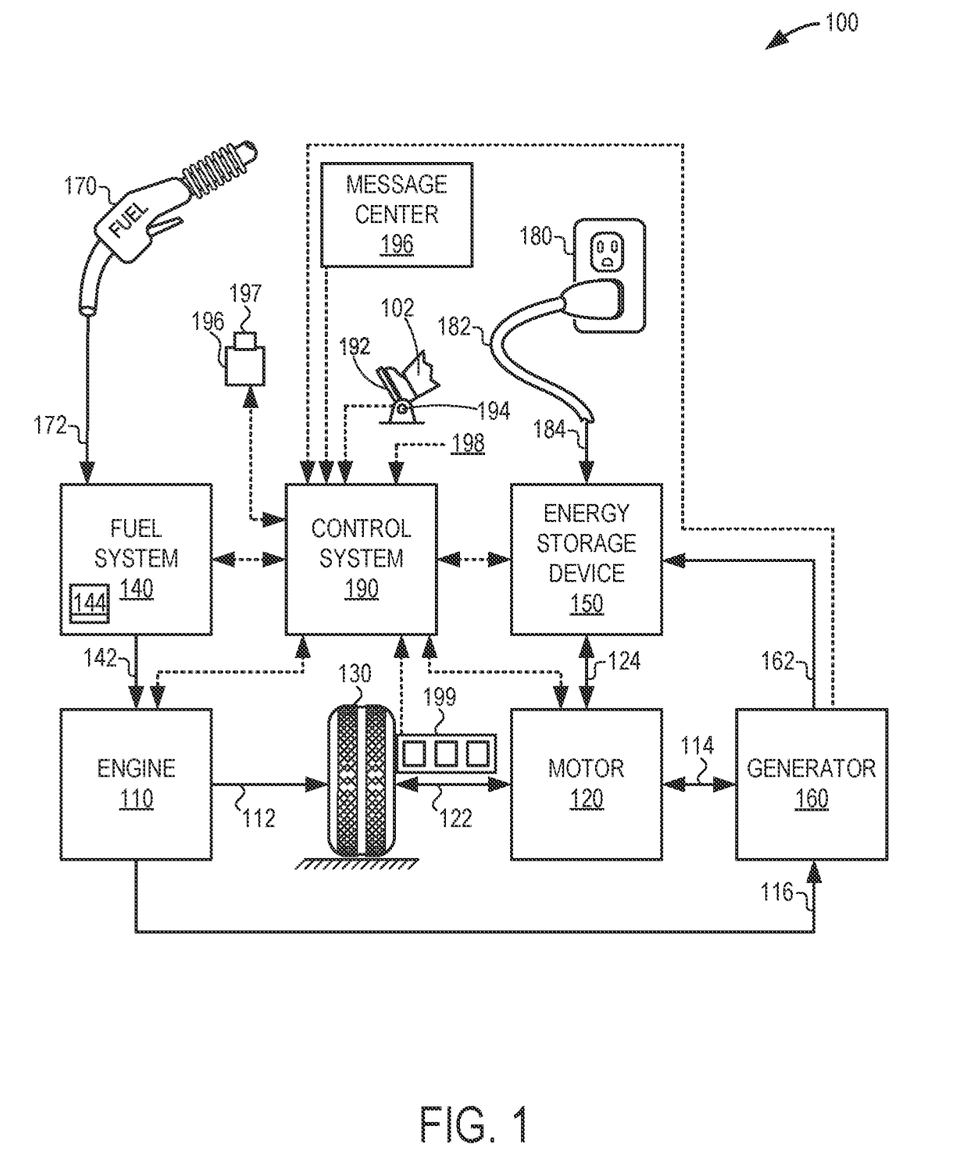
FIG. 1 shows a high-level block diagram illustrating an example vehicle propulsion system.
Figure 2:
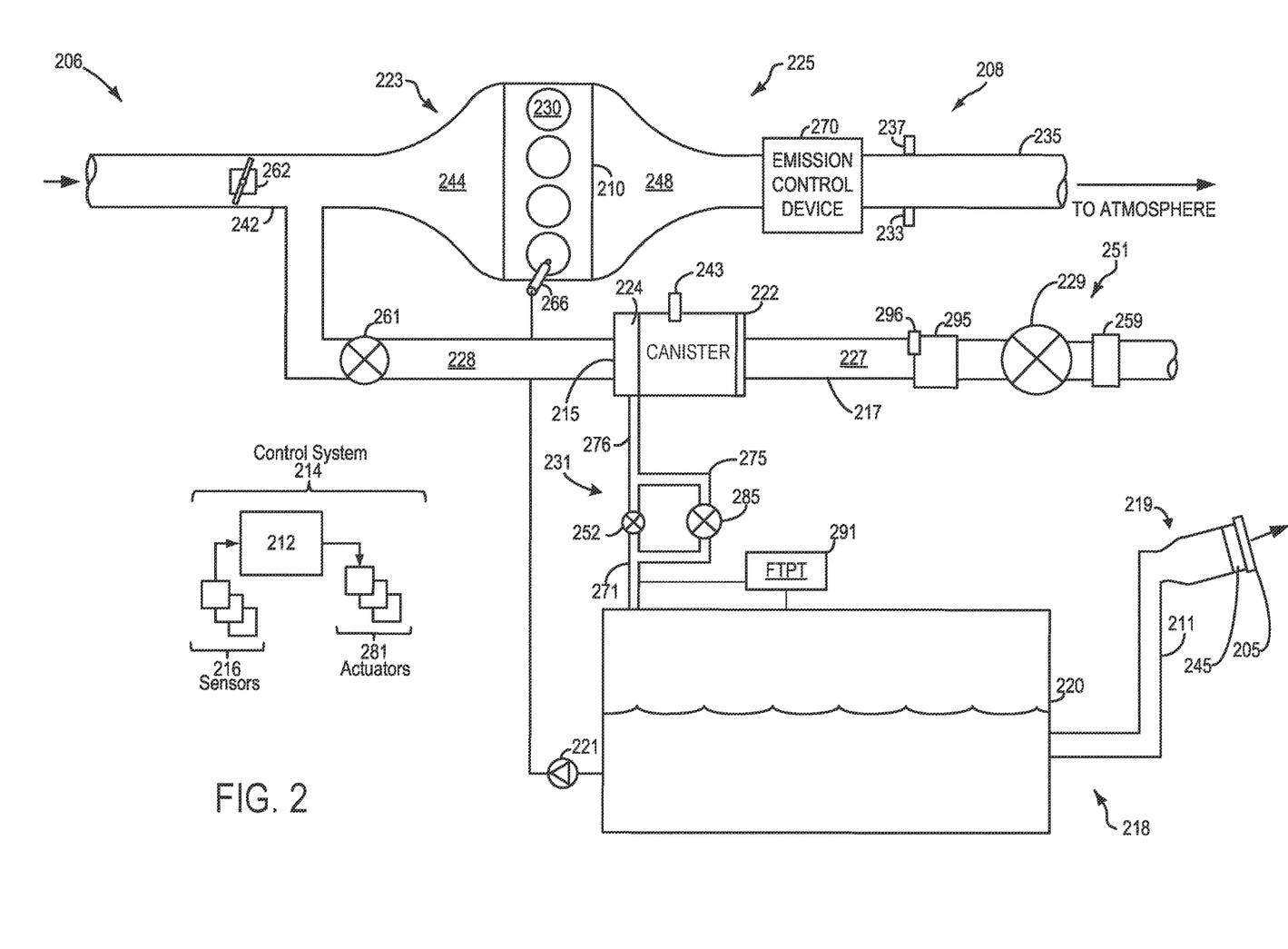
FIG. 2 shows an example engine system, fuel system, and evaporative emissions control (EVAP) system included in the example vehicle system of FIG. 1.
Figure 3:
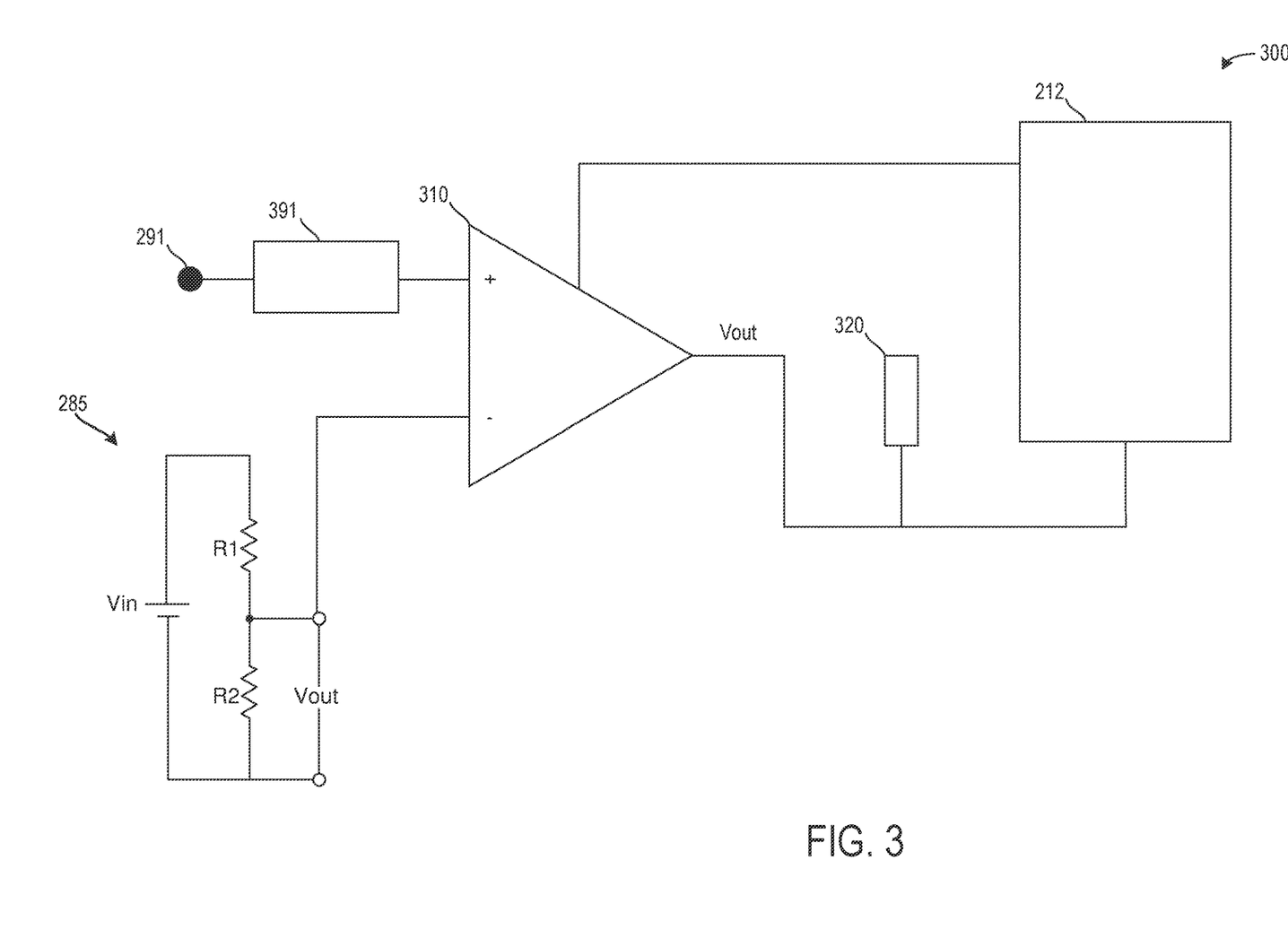
FIG. 3 shows a circuit diagram for a controller of the EVAP system.
Figure 5:
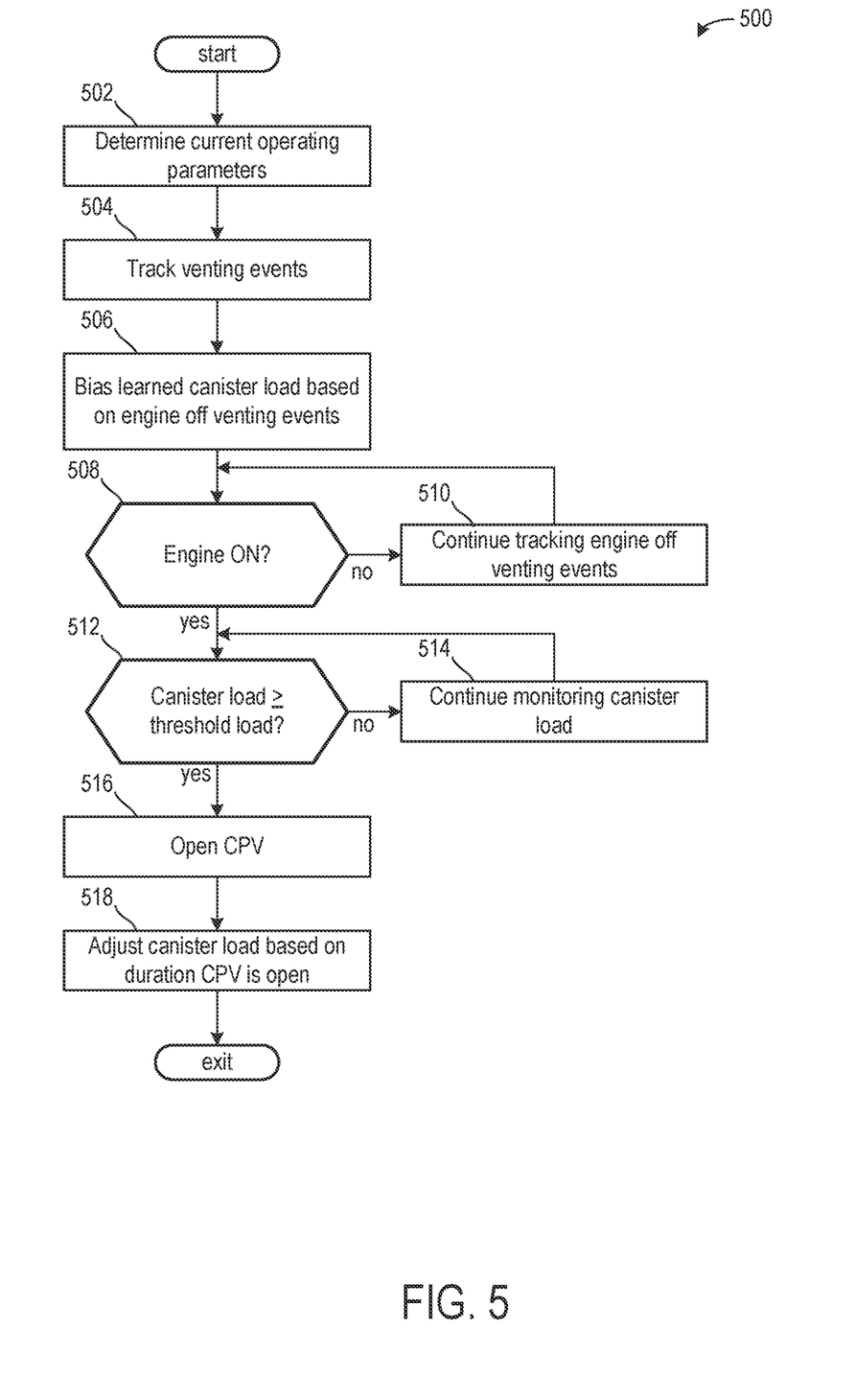
FIG. 5 shows a method for operating the EVAP system.
Figure 6:
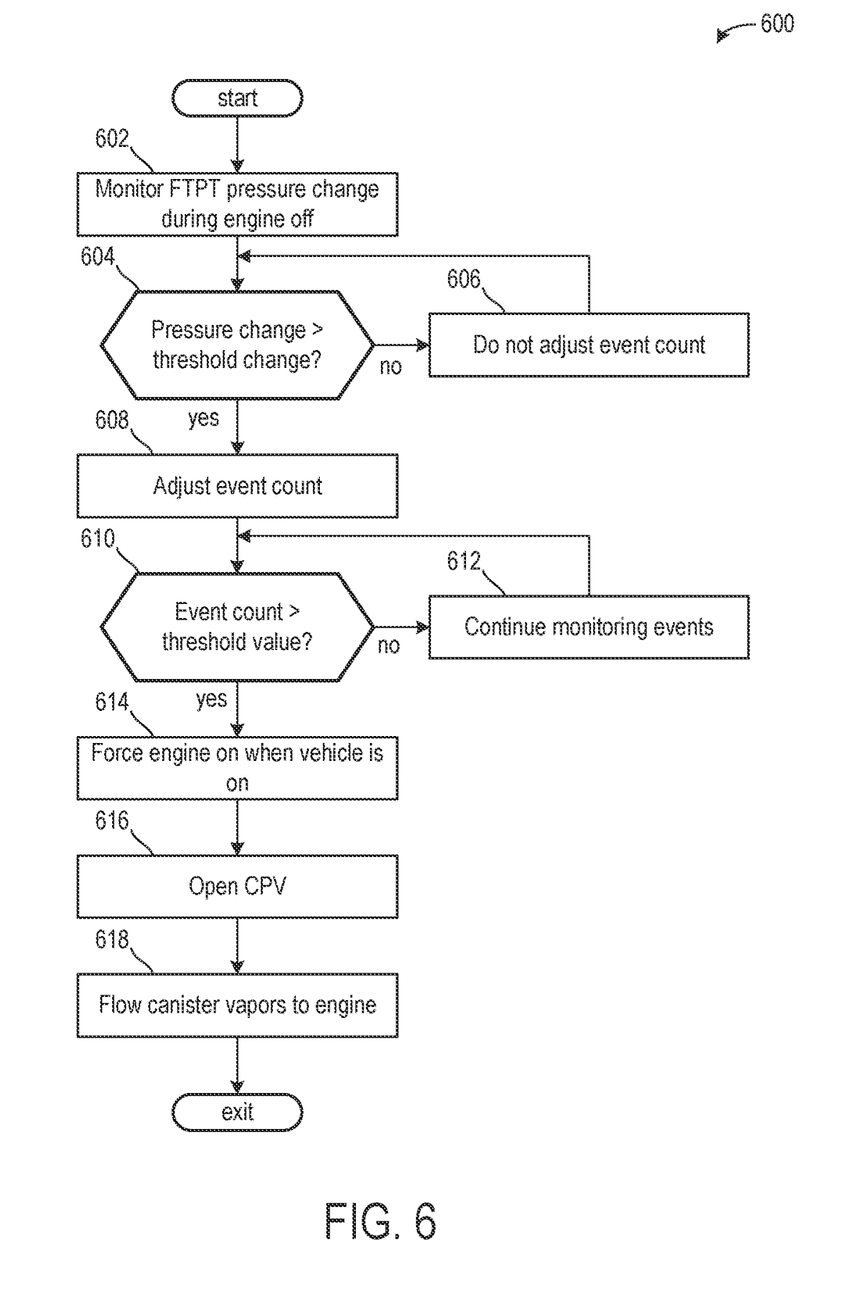
FIG. 6 shows a method for adjusting an event count.

The following description relates to systems and methods for an EVAP system of a vehicle. The vehicle may be an at least partially electric vehicle including an all-electric mode. An example of the vehicle and EVAP system is shown in FIGS. 1 and 2. Operation of the EVAP system may be controlled via a controller. A circuit of the controller is illustrated in FIG. 3. A biased learning of the concentration of vapors of the EVAP system is illustrated in comparison to an unbiased learning in FIG. 4. The biased learning may increase a frequency of venting, as shown in FIG. 5 and in the graphical operating sequence of FIG. 7. A method for adjusting the event count is shown in FIG. 6.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle, such as from solar or wind energy. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an evaporative emissions control system 251 and a fuel system 218. Emissions control system 251 includes a fuel vapor container such as fuel vapor canister 222 which may be used to capture and store fuel vapors. In some examples, vehicle system 206 may be a hybrid electric vehicle system, such as the vehicle propulsion system 100 of FIG. 1.

The engine system 208 may include engine 210 having a plurality of cylinders 230. In one example, engine 210 is an embodiment of engine 110 of FIG. 1. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. In one example, fuel tank 220 includes fuel tank 144 of FIG. 1. The fuel pump system 221 may include one or more pumps for pressurizing fuel delivered to the injectors of engine 210, such as an example injector 266 shown. While a single injector 266 is shown, additional injectors are provided for each cylinder. It will be appreciated that fuel system 218 may be a return-less fuel system, a return fuel system, or various other types of fuel system.

Vapors generated in fuel system 218 may be routed to the evaporative emissions control system 251, which includes fuel vapor canister 222 via vapor line 231, before being purged to the engine intake 223. Vapor line 231 may be coupled to fuel tank 220 via one or more conduits and may include one or more valves for isolating the fuel tank during certain conditions. For example, vapor line 231 may be coupled to fuel tank 220 via one or more or a combination of conduits 271, 275, and 276.

Further, in some examples, one or more fuel tank vent valves may be positioned in conduits 271, 275, or 276. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a fuel tank isolation valve (FTIV) 252. Conduit 275 may include a relief valve (RV) 285. In one example, the conduit 275 is a bypass conduit, wherein the RV 285 is configured to flow vapors to the canister 222 when the FTIV 252 is closed. Further, in some examples, vapor line 231 may be coupled to a refueling system 219. In some examples, refueling system 219 may include a fuel cap 205 for sealing off the fuel filler system from the atmosphere. Refueling system 219 is coupled to fuel tank 220 via a fuel filler pipe 211.

Further, refueling system 219 may include a refueling lock 245. In some embodiments, the refueling lock 245 may be a fuel cap locking mechanism. The fuel cap locking mechanism may be configured to automatically lock the fuel cap 205 in a closed position so that the fuel cap cannot be opened. For example, the fuel cap 205 may remain locked via refueling lock 245 while pressure or vacuum in the fuel tank 220 is greater than a threshold. In response to a refueling request, e.g., a vehicle operator initiated request via actuation of a refueling button on a vehicle dashboard (such as refueling button 197 on vehicle instrument panel 196 of FIG. 1), the fuel tank may be depressurized and the fuel cap unlocked after the pressure or vacuum in the fuel tank falls below a threshold. Herein, unlocking the refueling lock 245 may include unlocking the fuel cap 205. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more fuel vapor canisters 222 (herein also referred to simply as canister) filled with an appropriate adsorbent, the canisters configured to temporarily trap fuel vapors (including vaporized hydrocarbons) generated during fuel tank refilling operations and "running loss" vapors (that is, fuel vaporized during vehicle operation). In one example, the adsorbent used is activated charcoal. Emissions control system 251 may further include a canister ventilation path or vent line 227 which may route gases out of the fuel vapor canister 222 to the atmosphere when storing, or trapping, fuel vapors from fuel system 218. When the emissions control system 251 includes more than one canister 222, the canisters may be arranged in series or in parallel. When the canisters are arranged in series, gases may be routed to a first canister of the more than one canisters, then from the first canister to a second canister of the more than one canisters, and so on for additional canisters of the one or more canisters. When the canisters are arranged in parallel, a total volume of gases routed through the more than one canisters may be routed to the first canister or the second canister, or the total volume of gases may be divided into two volumes with a first volume of the two volumes routed through the first canister and a second volume of the two volumes routed through the second canister.

Vent line 227 may also allow fresh air to be drawn into canister 222 via vent valve 229 when purging stored fuel vapors from fuel system 218 to engine intake 223 via purge line 228 and purge valve 261. For example, purge valve 261 may be normally closed but may be opened during certain conditions (such as certain engine running conditions) so that vacuum from engine intake manifold 244 is applied on the fuel vapor canister for purging. In some examples, vent line 227 may include an optional air filter 259 disposed therein upstream of canister 222. Flow of air and vapors between canister 222 and the atmosphere may be regulated by canister vent valve 229. Undesired evaporative emission detection routines may be intermittently performed by controller 212 on fuel system 218 to confirm that the fuel system is not degraded. As such, undesired evaporative emission detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, undesired evaporative emission detection routines may be performed while the engine is running by operating a vacuum pump and/or using engine intake manifold vacuum. Undesired evaporative emission tests may be performed by an evaporative leak check module (ELCM) 295 communicatively coupled to controller 212. ELCM 295 may be coupled in vent line 227, between canister 222 and the vent valve 229. ELCM 295 may include a vacuum pump configured to apply a negative pressure to the fuel system when in a first conformation, such as when administering a leak test. ELCM 295 may further include a reference orifice and a pressure sensor 296. Following the application of vacuum to the fuel system, a change in pressure at the reference orifice (e.g., an absolute change or a rate of change) may be monitored and compared to a threshold. Based on the comparison, undesired evaporative emissions from the fuel system may be identified. The ELCM vacuum pump may be a reversible vacuum pump, and thus configured to apply a positive pressure to the fuel system when a bridging circuit is reversed placing the pump in a second conformation.

Canister 222 may include a first buffer 224 surrounding load port 213. Like canister 222, buffer 224 may also include adsorbent. The volume of buffer 224 may be smaller than (e.g., a fraction of) the volume of canister 222. The adsorbent in the buffer 224 may be same as, or different from, the adsorbent in the canister (e.g., both may include charcoal). Buffer 224 may be positioned within canister 222 such that during canister loading through load port 213, fuel tank vapors are first adsorbed within the buffer, and then when the buffer is saturated, further fuel tank vapors are adsorbed in the main body of the canister. In comparison, when purging canister 222 with air drawn through vent line 227, fuel vapors are first desorbed from the canister (e.g., to a threshold amount) before being desorbed from the buffer. In comparison, when purging canister 222 with air drawn through vent line 227, fuel vapors are first desorbed from the canister (e.g., to a threshold amount) before being desorbed from the buffer. In other words, loading and unloading of buffer 224 is not linear with the loading and unloading of the canister. As such, the effect of the canister buffer is to dampen any fuel vapor spikes flowing from the fuel tank to the canister, thereby reducing the possibility of any fuel vapor spikes going to the engine or being released through a tailpipe.

Fuel tank 220 is fluidically coupled to canister 222 via an outlet conduit 276, the outlet conduit 276 diverging from the fuel tank isolation valve (FTIV) 252 which controls the flow of fuel tank vapors from fuel tank 220 and through the inlet conduit 271 into canister 222. By adjusting a position of FTIV 252, fuel vapor flow from the fuel tank 220 to the canister 222 can be varied. FTIV 252 may be actuated to a first, open position that couples fuel tank 220 to canister 222 via conduit 276. In an example where the emissions control system 251 includes more than one canister 222 arranged in parallel, adjusting the position of the FTIV 252 to a first position may direct fuel vapor flow from the fuel tank 220 to a first canister, adjusting to a second position may direct fuel vapor flow from the fuel tank 220 to a second canister, and adjusting to a third position may direct fuel vapor flow from the fuel tank 220 to both the first and the second canisters. The FTIV may also be actuated to a fourth, closed position.

For example, FTIV 252 may be actuated to a closed position that seals fuel tank 220 from canister 222 when the emissions control system 251 includes one canister 222, wherein no fuel vapors flow through conduit 276. Controller 212 may command an FTIV position based on fuel system conditions including an operator request for refueling, fuel tank pressure, and canister load. In a second example, a 0.03" orifice is included in the place of FTIV 252 to restrict vapor flow to the canister.

In configurations where the vehicle system 206 is a hybrid electric vehicle (HEV), fuel tank 220 may be designed as a sealed fuel tank that can withstand pressure fluctuations typically encountered during normal vehicle operation and diurnal temperature cycles (e.g., steel fuel tank). In addition, the size of the canister 222 may be reduced to account for the reduced engine operation times in a hybrid vehicle. However, for the same reason, HEVs may also have limited opportunities for fuel vapor canister purging operations. Therefore, the use of a sealed fuel tank with a closed FTIV (also referred to as NIRCOS, or Non-Integrated Refueling Canister Only System), prevents diurnal and running loss vapors from loading the fuel vapor canister 222, and limits fuel vapor canister loading via refueling vapors only. FTIV 252 may be selectively opened responsive to a refueling request to depressurize the fuel tank 220 before fuel can be received into the fuel tank via fuel filler pipe 211. In particular, when the emissions control system 251 includes one canister 222, FTIV 252 may be actuated to the first open position to depressurize the fuel tank to the canister via first conduit 276 and canister load port 213.

In some embodiments (not shown), a pressure control valve (PCV) (e.g., RV 285) may be configured in a conduit coupling fuel tank 220 to canister 222 in parallel to conduit 276. When included, the RV may be controlled by the powertrain control module (e.g. controller 212) using a pulse-width modulation cycle to relieve any excessive pressure generated in the fuel tank, such as while the engine is running. Additionally or optionally, the RV may be pulse-width modulated to vent excessive pressure from the fuel tank when the vehicle is operating in electric vehicle mode, for example in the case of a hybrid electric vehicle.

When transitioned to a second (open) position for the emissions control system 251 with one canister 222, FTIV 252 allows for the venting of fuel vapors from fuel tank 220 to canister 222. The second open position may be a fully open position and the first open position may be a partially open position, e.g., half open.

For the emissions control system 251 with at least one canister 222, including more than one canister 222 arranged in parallel, fuel vapors may be stored in canister 222 while air stripped off fuel vapors exits into atmosphere via canister vent valve 229. Stored fuel vapors in the canister 222 may be purged to engine intake 223, when engine conditions permit, via the purge valve 261. Refueling lock 245 may be unlocked to open a fuel cap after fuel tank is sufficiently depressurized, such as below the second threshold pressure.

The RV 285 may open during conditions where the fuel tank pressure exceeds a threshold fuel tank pressure without input from controller 212. This may occur during conditions where the controller 212 is asleep, which may occur when the engine is off and/or when the vehicle is off. Venting events when the controller 212 is asleep may go untracked in prior art examples, leading to insufficient canister cleanings, which may result in vapors being released to atmosphere. FIGS. 3-7 discuss embodiments of the present disclosure for waking the controller 212 when the RV 285 is opened and tracking the venting events. The embodiments further describe adjusting a cleaning schedule of the canister based on a venting event count.

The vehicle system 206 may further include a control system 214 (such as control system 190 of FIG. 1). Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, exhaust temperature or pressure sensor 233, fuel tank pressure transducer (FTPT) or pressure sensor 291, canister load sensor 243, and ELCM pressure sensor 296. As such, pressure sensor 291 provides an estimate of fuel system pressure. In one example, the fuel system pressure is a fuel tank pressure, e.g. within fuel tank 220. Other sensors such as pressure, temperature, air/fuel ratio, and composition sensors may be coupled to various locations in the vehicle system 206. As another example, the actuators may include the fuel injector 266, the throttle 262, the FTIV 252, the refueling lock 245, the canister vent valve 229, and the purge valve 261. The control system 214 may include a controller 212. The controller may receive input data from the various sensors, process the input data, and trigger the actuators in response to the processed input data based on instruction or code programmed therein corresponding to one or more routines. The controller 212 receives signals from the various sensors of FIGS. 1-2 and employs the various actuators of FIGS. 1-2 to adjust engine operation based on the received signals and instructions stored on a memory of the controller.

For example, responsive to an operator refueling request, the controller may retrieve sensor input from fuel tank pressure transducer (FTPT) 291 and compare it to a threshold. If the pressure is higher than the threshold, the controller may send a signal commanding FTIV 252 to a position that expedites depressurization of the fuel tank. Therein, based on canister load, as estimated via sensor 243, and/or based on an estimated time to depressurize the fuel tank, the controller 212 may adjust the position of FTIV 252 to depressurize the fuel vapors to the load port 213 of canister 222. Once the fuel tank has been sufficiently depressurized, as inferred based on the fuel tank pressure sensor output, the controller may send a signal commanding the refueling lock 245 to open or disengage so that fuel can be received in fuel tank 220 via the fuel filler pipe 211.

Turning now to FIG. 3, it shows a circuit 300 configured to wake up the controller 212 in response to a pressure change sensed by the FTPT 291. The controller 212 is coupled to an operational amplifier 310 configured to receive inputs from the FTPT 291, the relief valve 285, and the controller 212. A resistor 320 may control a voltage from the operational amplifier 310 to the controller 212. If the Vout from the operational amplifier 310 to the controller 212 is equal to zero, the controller 212 may wake up. Vout may be equal to zero when the FTPT sensed a pressure change greater than a threshold pressure change. The threshold pressure change may correspond to a pressure change that occurs when the relief valve is opened. Thus, the threshold pressure change may be based on an orifice size of the relief valve.

R1 and R2 may be selected based on a threshold venting limit of the relief valve 285, the threshold venting limit proportional to the orifice size of the relief valve 285. R1 and R2 are selected based on data stored in Table 1 below and input provided by FTPT 291 to operational amplifier 310 after passing through a filter 391.

TABLE 1

| Volts | A/D counts in PCM | FTP (kPa) | FTP (in $H_2O$) |
|---|---|---|---|
| 0.317 | 51 | −19 | −76.28 |
| .423 | 102 | −17.17 | −68.93 |
| 1.035 | 235 | −7.35 | −29.51 |
| 2.054 | 419 | 9.03 | 36.25 |
| 3.073 | 614 | 25.4 | 101.97 |
| 4.5 | 921 | 48.32 | 193.98 |
| 4.616 | 970 | 50 | 200.73 |

To solve for the voltage that corresponds to the mechanical venting of the RV 285, equation 1 below is used.

$$V_{out} = (0.0625961 \times P_{gage} + 1.466862) \quad \text{Equation 1}$$

Pgage is in kPa. As an example, if the mechanical venting limit of the RV 285 is 140 in $H_2O$, which is equal to 35 kPa, then the Vout is selected based on a current fuel tank pressure. If the Vout is determined to be equal to 3.25 V due to the fuel tank pressure being close to 25.4 kPa, then R1 and R2 may be selected to provide 3.25 V. Thus, R1 is equal to 10 kOhms and R2 is equal to 18.5 kOhms. Said another way, table 1 may provide a method for calculating a FTPT voltage that corresponds to a mechanical venting point of the relief valve. When the FTPT voltage is equal to 3.25 V, such as for a RV with a 140 in $H_2O$ venting point, the circuit wakes up the controller via a calibration of the R1 and R2 values. Once the controller is awake, the controller may record the venting event that would otherwise go untracked in previous examples.

Figure 4:
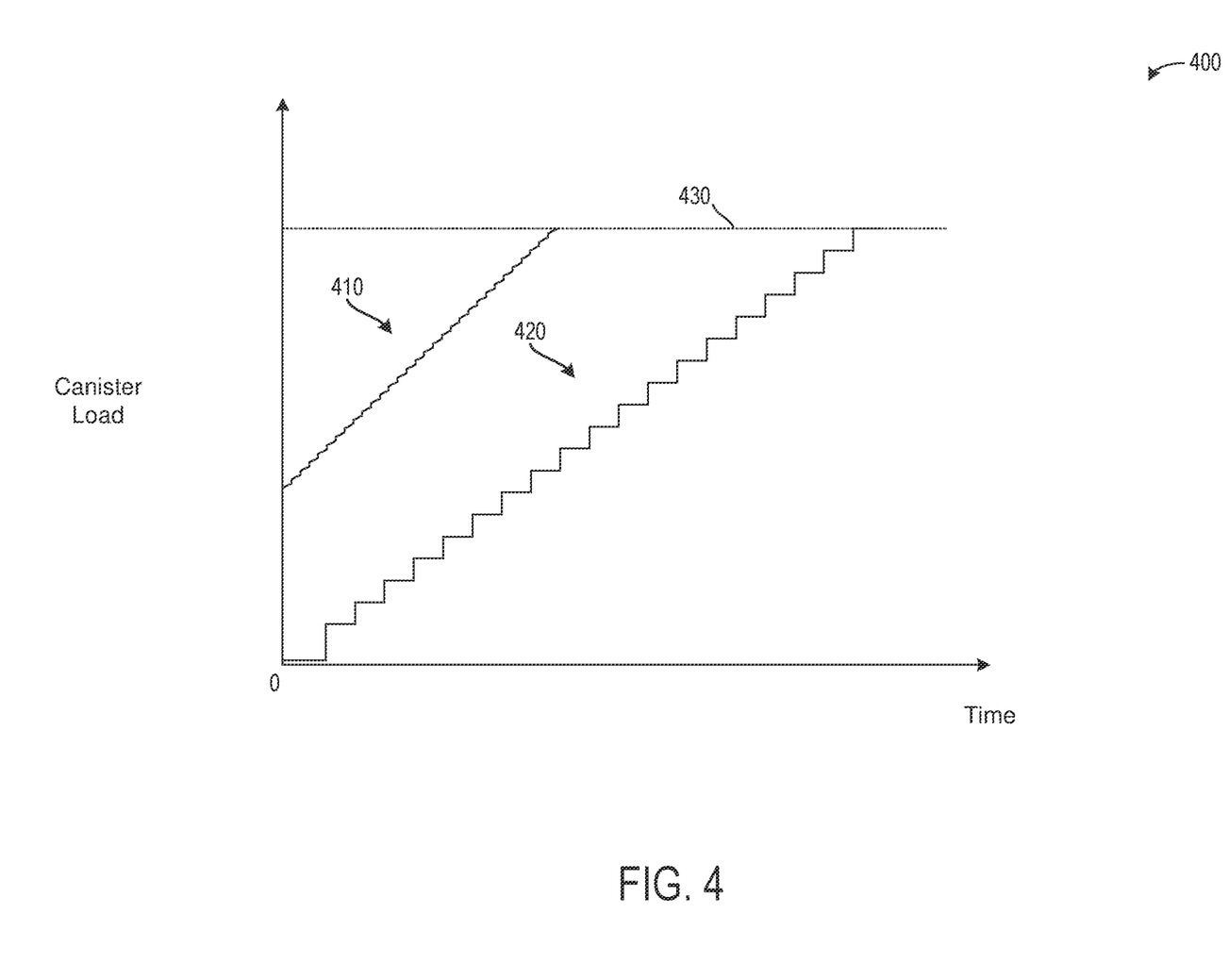
FIG. 4 shows a plot illustrating a biased learned concentration of vapors of the present disclosure compared to an unbiased learned concentration of vapors.

Turning now to FIG. 4, it shows a plot 400 illustrating a first learned canister concentration 410 and a second learned canister concentration 420. In one example, the first learned canister concentration 410 is a biased, learned canister concentration. The bias may include accounting for a running sum of engine off vent events. The second learned canister concentration 420 is an unbiased, learned canister concentration that starts from a 0 value at an engine start. The second learned canister concentration may not account for engine off venting events and refueling. Both learned canister concentrations may account for venting events when the engine is on.

The biased, learned canister concentration 410 reaches a threshold canister load value 430 faster than the unbiased, learned canister concentration 420, resulting in the CPV opening more quickly and/or frequently to vent canister vapors. Therefore, the learning routine of the biased, learned canister concentration 410 may vent the canister more frequently, which may mitigate undesired venting to atmosphere during all-electric operation of the vehicle and/or overloading of the canister.

Turning now to FIG. 5, it shows a method 500 for biasing a learning of the canister load. Instructions for carrying out method 500 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 500 begins at 502, which includes determining current operating parameters. Current operating parameters may include but are not limited to a vehicle operating mode, an ambient temperature, and ambient daylight directed toward the vehicle. The vehicle operating mode may include an all-electric mode, a hybrid mode, and an engine only mode. The all-electric mode may include where all vehicle operations are powered via an energy storage device. The hybrid mode may include where the energy storage device and the engine power vehicle operations. The engine only mode may include where the engine powers all vehicle operations. The ambient temperature may be determined via a weather service application in communication with a navigation system and/or the controller of the vehicle. Ambient daylight may be measured via a photovoltaic sensor or other light sensor of the vehicle. Additionally or alternatively, ambient light directed toward the vehicle may be estimated based on a location of the vehicle in combination with the ambient weather.

At 504, the method 500 may include tracking venting events. The venting events may include where fuel vapors from the fuel tank are vented to the canister when the vehicle is on or off (e.g., key-off). Additionally or alternatively, the powertrain control module in communication with actuators and sensors of the fuel system (e.g., controller 212) may be asleep (e.g., off) when the engine is off. The venting events may be tracked when the controller is awake and asleep based on the steps described herein. A venting event may be determined when a pressure sensed by the FTPT exceeds a threshold pressure change. Additionally or alternatively, the venting event may include where the relief valve is opened with or without a command from the controller. In some examples, venting events may be estimated based on sunlight directed toward the vehicle and/or ambient weather. For example, if an amount of sunlight contacting the vehicle exceeds a threshold light and/or if a vehicle temperature exceeds a threshold vehicle temperature, then a venting event may be assumed to have occurred. Additionally or alternatively, if the ambient temperature is greater than a threshold ambient temperature, then an event may be assumed to have occurred. It will be appreciated that the FTPT may sense pressure changes due to sunlight and ambient weather.

At 506, the method 500 may include biasing a learned canister load based on the engine off venting events. That is to say, by tracking the venting events via feedback from the FTPT, monitoring sunlight, and ambient weather, the learned canister load may be biased to include engine off vapor loading events that would be otherwise untracked (as illustrated in the unbiased, learned canister load 420 of FIG. 4). The wake-up circuit may wake up the controller to increase a venting count based on the FTPT sensed pressure when the controller is asleep.

At 508, the method 500 may include determining if the engine is on. The engine may be on if the engine is being fueled. If the engine is off (no at 508), then the method 500 may proceed to 510, which includes continuing tracking venting events. Thus, the canister load learning is further updated based on the venting events during the engine off. Additionally or alternatively, vapors from the canister may be blocked from flowing to the engine via maintaining a CPV closed.

If the engine is on (yes at 508), then at 512, the method 500 may include determining if the canister load is greater than or equal to a threshold canister load. The threshold canister load may be based on a load of the canister where cleaning is requested (e.g., 80% full, or 90% full, or 95% full). If the canister load is not greater than or equal to the threshold canister load, then at 514, the method 500 may include continuing to monitor the canister load. The CPV may remain closed. In some examples, additionally or alternatively, the CPV may be opened opportunistically when the engine is on.

If the canister load is greater than or equal to the threshold canister load, then at 516, the method 500 may include opening the CPV. By opening the CPV, vapors stored in the canister may flow to the engine and mix with combustion chamber elements therein.

At 518, the method 500 may include adjusting the canister load based on a duration the CPV is open. For example, as the duration the CPV is open increases, the canister load may decrease. When the CPV is open, the canister load decreases as vapors from the canister are drawn the engine via a manifold vacuum and/or positive pressure from atmosphere.

Turning now to FIG. 6, it shows a method 600 for tracking venting events and adjusting operating parameters based on the tracked events when the controller is asleep. At 602, the method 600 may include monitoring FTPT pressure changes during controller off. The vehicle may be on or off while the pressure changes are tracked during the controller off. In one example, the controller is off when the engine is off. In another example, additionally or alternatively, the controller is off when the vehicle is off.

At 604, the method 600 may include determining if a pressure change is greater than a threshold pressure change. The threshold pressure change may be based on a venting limit of the relief valve. Thus, if the pressure change is greater than the threshold pressure change, then a sensed pressure drop may indicate that the relief valve has opened (e.g., vented).

If the pressure change is not greater than the threshold pressure change, then at 606, the method 600 may include not adjusting an event count. That is to say, a tally corresponding to a number of venting events during an engine off when the controller is off is not adjusted.

In some examples, additionally or alternatively, if a venting event occurs when the engine is on, then the controller may be awake and track the venting event in a similar manner as described above.

If the pressure change is greater than the threshold pressure change, then at 608, the method 600 may include adjusting the event count. The controller may be woken up based on the circuit of FIG. 3 and the controller may increase the event count. In one example, each event may be accounted for similarly such that a tally changes by an identical value for each event. For example, the total event tally may increase by a value of one when a single event occurs. Additionally or alternatively, the tally may be adjusted dynamically based on conditions of the event. For example, the tally may be increased more if the pressure change is larger relative to a lower pressure change.

At 610, the method 600 may include determining if the event count is greater than a threshold count value. In one example, the threshold count value may correspond to a count total associated with a fully loaded canister or to a canister with a load greater than the threshold canister load. In some examples, the count total may be based on an average loading of the canister for each event. At any rate, the event count may be used to determine when a cleaning of the canister is desired. The controller may adjust a cleaning schedule based on the event count and its comparison to the threshold count value.

If the event count is not greater than the threshold value, then at 612, the method 600 may include continuing to monitor venting events. The engine is not forced on. In some examples, additionally or alternatively, the method may opportunistically direct canister vapors to the engine when the engine is turned on based on a driver demand or other operating conditions via opening the CPV. However, the load of the canister learned based on the tracked events does not meet the threshold value to intrusively force the engine on and shift operation from the all-electric mode to the hybrid mode or engine only mode.

At 614, the method 600 may include forcing the engine on when the vehicle is on. The vehicle is on in response to a button being depressed, a key being turned in an ignition of the vehicle, and/or an option being selected on a wireless device (e.g., a remote start). Forcing the engine on may include fueling the engine during conditions that may be executed during the all-electric condition.

In one example, if the vehicle is typically operated in the all-electric mode in response to a vehicle start, the adjusted cleaning schedule may force the engine on to operate in the hybrid mode or the engine-only mode at the vehicle start. In this way, the adjusted cleaning schedule further includes adjusting fueling of the engine, wherein a load of the engine may increase in proportion to the canister load. As the canister load decreases during the cleaning, the engine load may also decrease, and an electric motor load may increase. By doing this, fuel savings realized via electric operation of the vehicle may be achieved while mitigating vapors leaked to atmosphere.

At 616, the method 600 may include opening the CPV.

At 618, the method 600 may include flowing canister vapors to the engine. In one example, a load at which the engine is set may be selected based on one or more of the canister load, driver demand, fuel tank level, ambient weather conditions, vehicle location, and the like. For example, the load may be increased as the canister load increases so that more vapors may be consumed. Additionally or alternatively, a duration at which the engine is on may be adjusted based on the above conditions. As another example, additionally or alternatively, if the ambient weather is hot and/or if the vehicle is in a location with a high amount of sunlight, then the engine load may be increased and/or the duration the engine is on may be extended to consume more vapors and more fuel, which may reduce vapor generation and further reduce the canister load and/or the frequency at which the engine is turned on to clean the canister. By doing this, vapor generation once the engine is off may be reduced and the canister may be in a state configured to receive more vapors, reducing a likelihood that vapors are released therefrom during the engine off due to overloading. When the canister is cleaned, the method may further include decreasing the venting event count to match a count proportional to a load of the canister after the cleaning.

In some embodiments, when the engine is fueled to clean the canister, the engine power may be used for operations other than moving the vehicle. For example, the engine may power auxiliary devices, charge an energy storage device, and the like. As such, an engine load may be relatively low during the canister cleaning.

Figure 7:
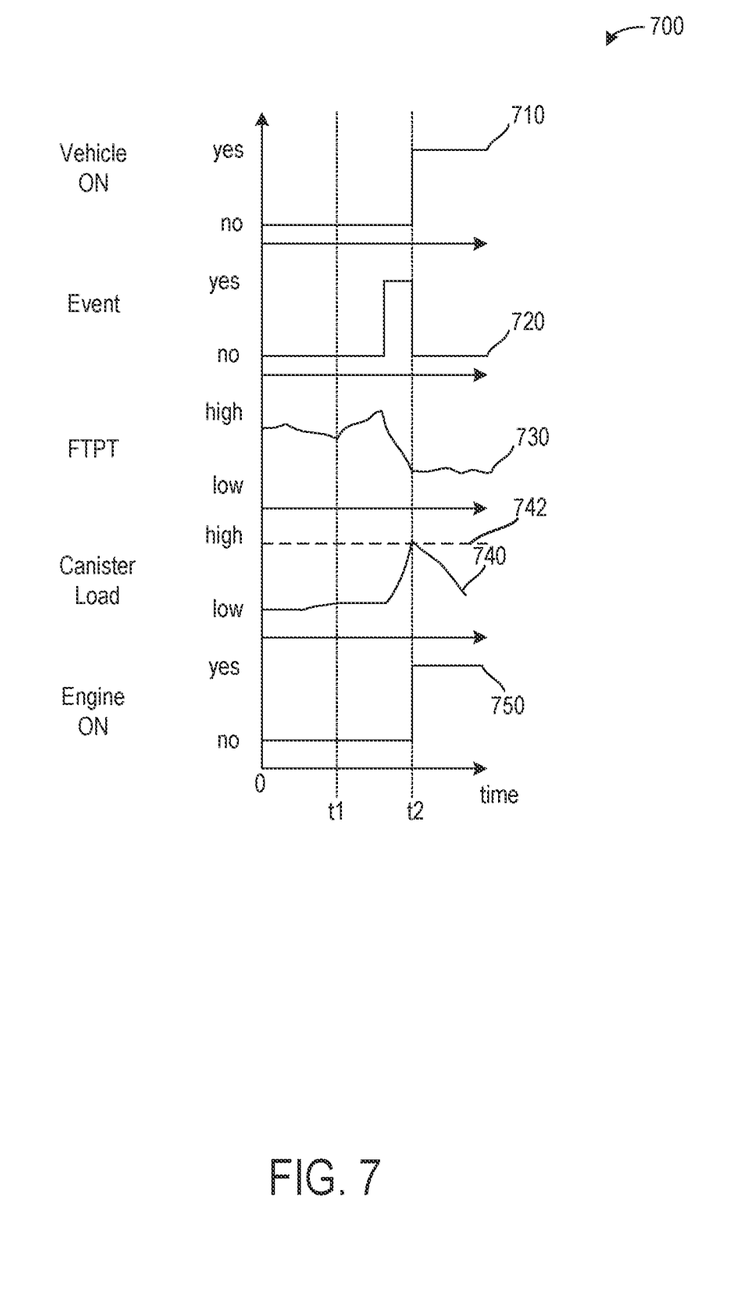
FIG. 7 shows a plot graphically illustrating an operating sequence of the EVAP system and the engine.

Turning now to FIG. 7, it shows a graph 700 graphically illustrating an operating sequence illustrating vehicle conditions and pressure changes sensed by the FTPT to monitor venting events during an engine off. Plot 710 illustrates if a vehicle is on. Plot 720 illustrates if a venting event is occurring. Plot 730 illustrates a pressure change sensed by the FTPT. Plot 740 illustrates a canister load and dashed line 742 illustrates a threshold canister load. Plot 750 illustrates if an engine is ON. Time increases from a left to a right side of the figure.

Prior to t1, the vehicle and engine are off. The canister load is relatively low. Pressure changes sensed by the FTPT do not trigger a venting event to be recorded. At t1, the vehicle and engine are off. Between t1 and t2, the FTPT senses a pressure change (e.g., decrease). The pressure change is greater than the threshold pressure change and the event is recorded. As such, the learned canister load is increased toward the threshold canister load via the tracked venting event while the engine is off.

At t2, the vehicle is on. The learned canister load exceeds the threshold canister load and the engine is forced on. After t2, the canister load decreases as vapors from the canister are directed to the engine. Once the canister load is below a lower threshold canister load, the engine may be turned off and the vehicle operated in the all-electric mode.

In this way, venting events when the engine is off may be tracked via monitoring pressure changes sensed by the FTPT. When the changes exceed a threshold pressure change, the controller is woken up to tally the event. A canister load is learned and modified to account for the events during the engine off. If the learned canister load exceeds a threshold canister load, then the engine is forced on when the vehicle is on to return the canister load to a load less than the threshold canister load. The technical effect of tracking venting events during the engine off is to increase a cleaning frequency of the canister load to accommodate more driving conditions in the all-electric mode. By doing this, the vehicle may be driven in the all-electric mode more frequently while reducing a likelihood that the canister becomes overloaded and unexpectedly releases vapors into the atmosphere.

The disclosure provides support for a method for a fuel system of a vehicle including monitoring a sensed fuel tank pressure transducer (FTPT) pressure, tracking a number of events comprising where the sensed FTPT pressure changed by a threshold pressure change, and adjusting a canister cleaning schedule based on the number of events. A first example of the method further includes estimating a canister load based on the number of events. A second example of the method, optionally including the first example, further includes where the tracking occurs when an engine of the vehicle is unfueled and a controller is off. A third example of the method, optionally including one or more of the previous examples, further includes where events correspond to uncontrolled venting of a fuel tank via a relief valve that is not signaled by a controller. A fourth example of the method, optionally including one or more of the previous examples, further includes forcing an engine on in response to the number of events. A fifth example of the method, optionally including one or more of the previous examples, further includes opening a canister purge valve after forcing the engine on. A sixth example of the method, optionally including one or more of the previous examples, further includes where the tracking occurs during engine on conditions, fuel tank refueling conditions, and engine off conditions without refueling.

The disclosure provides further support for a method for a fuel system of a hybrid vehicle including a fuel system coupled to an engine, the fuel system comprising a fuel tank, a canister, and a fuel tank pressure transducer (FTPT), the method, including waking up a controller in response to a pressure change sensed by the FTPT being greater than a threshold change, increasing a venting event count, and adjusting a cleaning schedule of the canister based on the venting event count. A first example of the method further includes where adjusting the cleaning schedule comprises interrupting an all-electric operation of the hybrid vehicle and activating a hybrid mode operation by fueling the engine. A second example of the method, optionally including the first example, further includes where the venting event count tracks venting events that occur when the controller is asleep and awake. A third example of the method, optionally including one or more of the previous examples, further includes where estimating a venting event in response to one or more of an ambient temperature and an amount of sunlight contacting the hybrid vehicle. A fourth example of the method, optionally including one or more of the previous examples, further includes where adjusting the cleaning schedule comprises increasing a cleaning frequency of the canister proportional to the venting event count. A fifth example of the method, optionally including one or more of the previous examples, further includes where the FTPT is coupled to the fuel tank and a conduit. A sixth example of the method, optionally including one or more of the previous examples, further includes where a fuel tank isolation valve (FTIV) is arranged in the conduit, further comprising a relief valve arranged in a bypass conduit, wherein the bypass conduit is coupled to locations of the conduit upstream and downstream of the FTIV. A seventh example of the method, optionally including one or more of the previous examples, further includes maintaining the cleaning schedule in response to the venting event count not changing.

The disclosure provides additional support for a system for a hybrid vehicle including an electric motor coupled to an energy storage device, an engine coupled to a fuel system, the fuel system comprising a fuel tank, a canister, a fuel tank pressure transducer (FTPT), a fuel tank isolation valve (FTIV), and a relief valve, and a controller with computer-readable instructions stored on memory thereof that enable the controller to adjust a cleaning schedule of the canister in response to a learned canister load equaling a threshold canister load, wherein the learned canister load accounts for venting events that occur during vehicle on and vehicle off conditions. A first example of the system further includes where the controller is woken up via a wake-up circuit coupled to the FTPT and the controller when the vehicle is off, wherein the wake-up circuit signals to wake up the controller and increase a venting event count in response to a pressure change sensed by the FTPT exceeding a threshold pressure change. A second example of the system, optionally including the first example, further includes where the instructions further enable the controller to adjust the cleaning schedule via increasing a frequency of by forcing the engine on during an all-electric mode when the vehicle is on. A third example of the system, optionally including one or more of the previous examples, further includes where the instructions further enable the controller to open a purge valve between the canister and the engine and combust vapors from the canister via the engine during a cleaning of the canister. A fourth example of the system, optionally including one or more of the previous examples, further includes where the instructions further enable the controller to maintain the cleaning schedule.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a fuel system of a vehicle, comprising:
   monitoring a sensed fuel tank pressure transducer (FTPT) pressure;
   tracking a number of events comprising where the sensed FTPT pressure changed by a threshold pressure change; and
   adjusting a canister cleaning schedule based on the number of events.

2. The method of claim 1, further comprising estimating a canister load based on the number of events.

3. The method of claim 1, wherein the tracking occurs when an engine of the vehicle is unfueled and a controller is off.

4. The method of claim 1, wherein events correspond to uncontrolled venting of a fuel tank via a relief valve that is not signaled by a controller.

5. The method of claim 1, further comprising forcing an engine on in response to the number of events.

6. The method of claim 5, further comprising opening a canister purge valve after forcing the engine on.

7. The method of claim 1, wherein the tracking occurs during engine on conditions, fuel tank refueling conditions, and engine off conditions without refueling.

8. A method for a fuel system of a hybrid vehicle comprising a fuel system coupled to an engine, the fuel system comprising a fuel tank, a canister, and a fuel tank pressure transducer (FTPT), the method, comprising:
   waking up a controller in response to a pressure change sensed by the FTPT being greater than a threshold change;
   increasing a venting event count; and
   adjusting a cleaning schedule of the canister based on the venting event count.

9. The method of claim 8, wherein adjusting the cleaning schedule comprises interrupting an all-electric operation of the hybrid vehicle and activating a hybrid mode operation by fueling the engine.

10. The method of claim 8, wherein the venting event count tracks venting events that occur when the controller is asleep and awake.

11. The method of claim 8, further comprising estimating a venting event in response to one or more of an ambient temperature and an amount of sunlight contacting the hybrid vehicle.

12. The method of claim 8, wherein adjusting the cleaning schedule comprises increasing a cleaning frequency of the canister proportional to the venting event count.

13. The method of claim 8, wherein the FTPT is coupled to the fuel tank and a conduit.

14. The method of claim 13, wherein a fuel tank isolation valve (FTIV) is arranged in the conduit, further comprising a relief valve arranged in a bypass conduit, wherein the bypass conduit is coupled to locations of the conduit upstream and downstream of the FTIV.

15. The method of claim 8, further comprising maintaining the cleaning schedule in response to the venting event count not changing.

16. A system for a hybrid vehicle, comprising:
   an electric motor coupled to an energy storage device;
   an engine coupled to a fuel system, the fuel system comprising a fuel tank, a canister, a fuel tank pressure transducer (FTPT), a fuel tank isolation valve (FTIV), and a relief valve; and
   a controller with computer-readable instructions stored on memory thereof that enable the controller to:
   adjust a cleaning schedule of the canister in response to a learned canister load equaling a threshold canister load, wherein the learned canister load accounts for venting events that occur during vehicle on and vehicle off conditions.

17. The system for the hybrid vehicle of claim 16, wherein the controller is woken up via a wake-up circuit coupled to the FTPT and the controller when the vehicle is off, wherein the wake-up circuit signals to wake up the controller and increase a venting event count in response to a pressure change sensed by the FTPT exceeding a threshold pressure change.

18. The system for the hybrid vehicle of claim 16, wherein the instructions further enable the controller to adjust the cleaning schedule via increasing a frequency of by forcing the engine on during an all-electric mode when the vehicle is on.

19. The system for the hybrid vehicle of claim 16, wherein the instructions further enable the controller to open a purge valve between the canister and the engine and combust vapors from the canister via the engine during a cleaning of the canister.

20. The system of claim 16, wherein the instructions further enable the controller to maintain the cleaning schedule.

* * * * *